United States Patent [19]

O'Rorke

[11] Patent Number: 4,460,142
[45] Date of Patent: Jul. 17, 1984

[54] BRACKET FOR SUPPORTING A SIGN TO A CYLINDRICAL POST

[76] Inventor: Blondale O'Rorke, 14000 N. Scott, Edmond, Okla. 73034

[21] Appl. No.: 345,807

[22] Filed: Feb. 4, 1982

[51] Int. Cl.³ .............................................. A47B 96/06
[52] U.S. Cl. ....................................... 248/231; 248/214
[58] Field of Search ............... 248/231, 230, 214, 291, 248/229, 316 R; 340/119, 120; 254/222

[56] References Cited

U.S. PATENT DOCUMENTS

| 2,655,332 | 10/1953 | Carpenter et al. | 248/73 |
| 3,586,280 | 6/1971 | Parduhn | 248/230 |
| 3,638,891 | 2/1972 | Schlosser | 248/230 |
| 3,854,685 | 12/1974 | Parduhn | 248/231 |
| 3,917,205 | 11/1975 | Meadors | 248/229 |
| 4,142,173 | 2/1979 | Gould et al. | 340/119 |
| 4,171,796 | 10/1979 | Forbush | 254/222 |

Primary Examiner—William H. Schultz
Assistant Examiner—Ramon O. Ramirez
Attorney, Agent, or Firm—Head, Johnson & Stevenson

[57] ABSTRACT

A bracket for supporting a sign to a cylindrical post is held to the post by means of a flexible band, one end of the band being wound onto a slotted bolt to tighten the bracket against the post, the bracket having a recess to receive the head of the bolt so as to retain tension on the band.

6 Claims, 4 Drawing Figures

BRACKET FOR SUPPORTING A SIGN TO A CYLINDRICAL POST

BACKGROUND OF THE INVENTION

1. Field of the Invention

This invention relates to brackets for use in supporting signs, particularly traffic signs. The bracket is particularly useful on supporting lighted traffic signs to horizontal mast arms for use in traffic control.

2. Description of the Prior Art

Traffic control is typically accomplished by use of lighted signs having red, amber and green lighted portions. These signs are frequently supported on horizontal mast arms. In order to properly align a sign on a mast arm, the bracket mechanism by which the sign is supported must provide for universal adjustment, that is, enable the sign to be adjusted around its X, Y and Z axis.

Others have provided brackets intended to accomplish this purpose, such as described in U.S. Pat. No. 3,586,280. However, the known type of devices, such as illustrated in this prior issued patent, have some advantages and limitations.

Workmen are frequently required to install traffic control signs at elevated positions above streets and highways. For this reason, a method needs to be provided wherein the signs can be quickly mounted to a mast arm, properly oriented, and retained in such a way that once mounted they will remain in position and will not be disoriented as a result of wind, vibration, and so forth.

An object of this invention is to provide an improved sign mounting bracket by which traffic signs can be expeditiously mounted on mast arms and in a manner to reduce the possibility of the becoming disoriented.

SUMMARY OF THE INVENTION

A bracket for supporting a sign to a cylindrical post, such as a horizontal mast arm, is provided. The bracket includes a body portion having a forward end which has means to receive a member, such as a cylindrical element to support a sign. The rearward end of the body portion is adapted to engage the surface of a cylindrical post, such as a horizontally extending mast arm, to which a sign is to be supported. Spaced apart axially aligned small diameter openings are provided in the body portion, the axis of the openings being parallel the body rearward end. A shallow depth noncircular recess (preferably hexagonal) is provided in the body in axial alignment with each of the small diameter openings, the recesses being of larger dimensions than the openings. A pair of flexible bands is employed, each having the first end thereof affixed to the body. The bands extend around the mast arm, the second ends of each of the bands extending through slots formed in the body. A bolt having an enlarged noncircular head (preferably hexagonal) and having a slot therein is received in each of the small diameter openings. The second end of each of the bands is received in a bolt slot so that each of the bolts may be rotated to wind the bands thereon to tighten the bands against the post. After the bands are tightened, the bolt heads may be driven into the shallow depth recesses to retain the bolts in nonrotatable position. The bracket body portion is thereby secured in the mast arm. The other elements necessary to support a sign are then affixed to the bracket body.

DESCRIPTION OF THE DRAWINGS

FIG. 4 is a partial cross-sectional view taken along the line 4—4 of FIG. 3 showing additional details of the bracket body.

DETAILED DESCRIPTION

Figure 1:
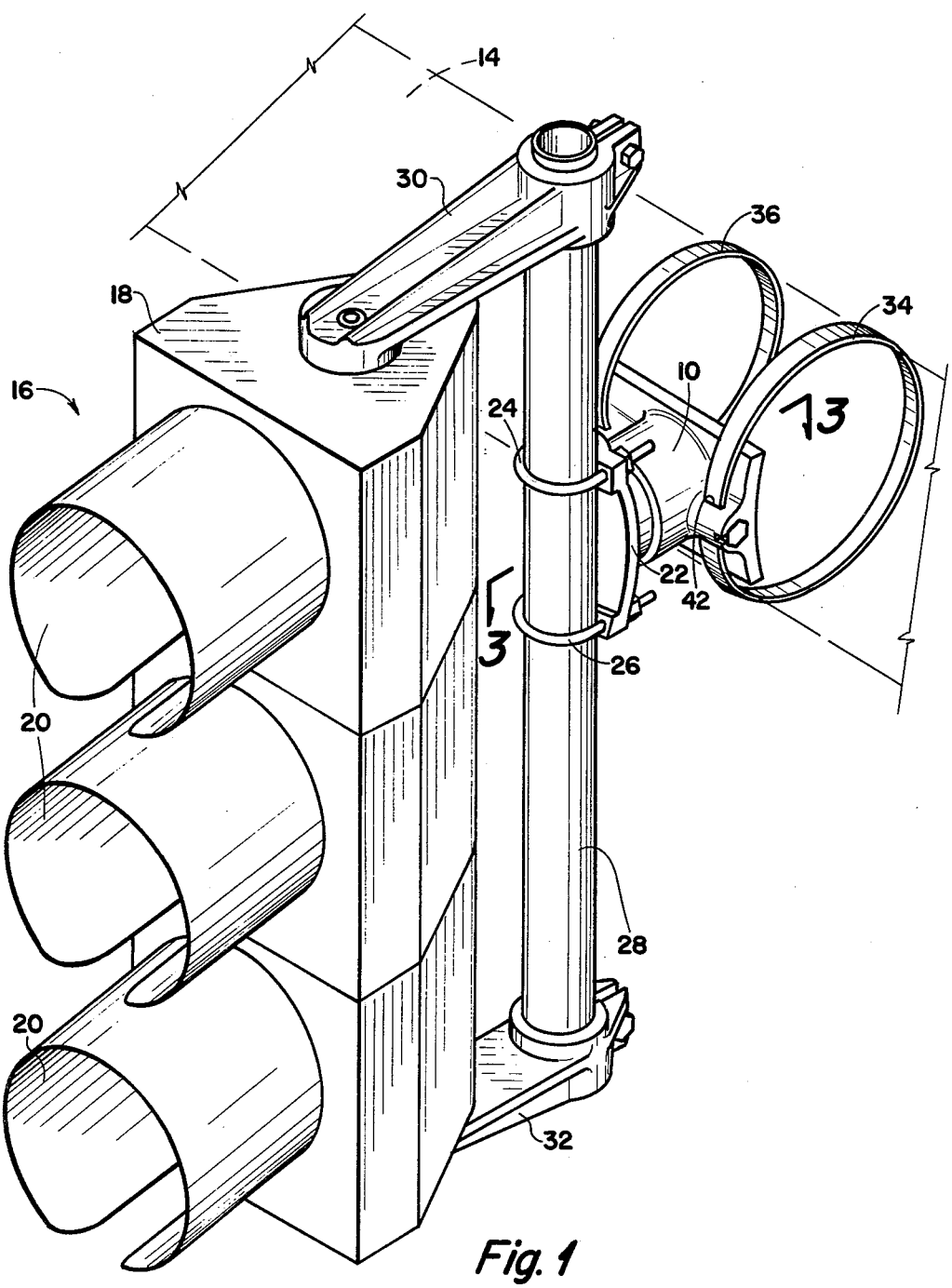
FIG. 1 is an isometric view of a sign and bracket of this invention as shown supported to a horizontal mast arm, the mast arm being shown in dotted outline.

Referring to the drawings and first to FIG. 1, a preferred embodiment of the invention is illustrated. The basic element of this invention is a bracket body portion 10. A post or, most typically, a horizontal mast arm 14 is indicated in dotted outline. The function of the bracket body 10 is to provide means of securing a sign to the mast arm 14.

A typical three-section traffic light sign is indicated generally by the numeral 16. The traffic light 16 includes a body portion 18 which may be formed of three stack portions, each of which is illustrated as including a lens hood 20. The traffic light body 18 is usually supported vertically, that is, where the lights are stacked invertical alignment on top of each other as illustrated but in some environments it is desirable that the lights be supported so that the body 18 is horizontal. In addition, in some instances the mast arm 14 is not perfectly horizontal; and when it is desirable to support the traffic light body 18 either vertically or horizontally, there must be provided an easily accomplished adjustment between the mast arm and the body. The object of this invention is to provide means to support the traffic light body 18 to the mast arm 14, and as indicated, the main element in accomplishing this result is the bracket body 10.

Before detailed description is given of the bracket body 10, the other main elements as shown in FIG. 1 will be described. Extending from the bracket body 10 is a male bracket portion 22 which will be described in detail subsequently. By means of U-bolts 24 and 26 which are attached to the male bracket portion 22, a support tube 28 is held in proper position relative to the mast arm 14. Extending from adjacent the top end of support tube 28 is an upper arm 30 and at the lower end of the support tube 28 is a lower arm 32. The arms 30 and 32 extend in the same plane of the support tube 28 and are spaced apart and parallel to each other and receive the traffic light body 18 therebetween.

In order to retain the bracket body 10 in proper position and orientation relative to mast arm 14, a pair of flexible bands 34 and 36 are employed. An important part of the invention is the manner in which the flexible bands are secured in position relative to the bracket body 10, and another important part of the invention is the manner in which the male bracket portion 22 is mounted with respect to the bracket body 10.

Figure 2:
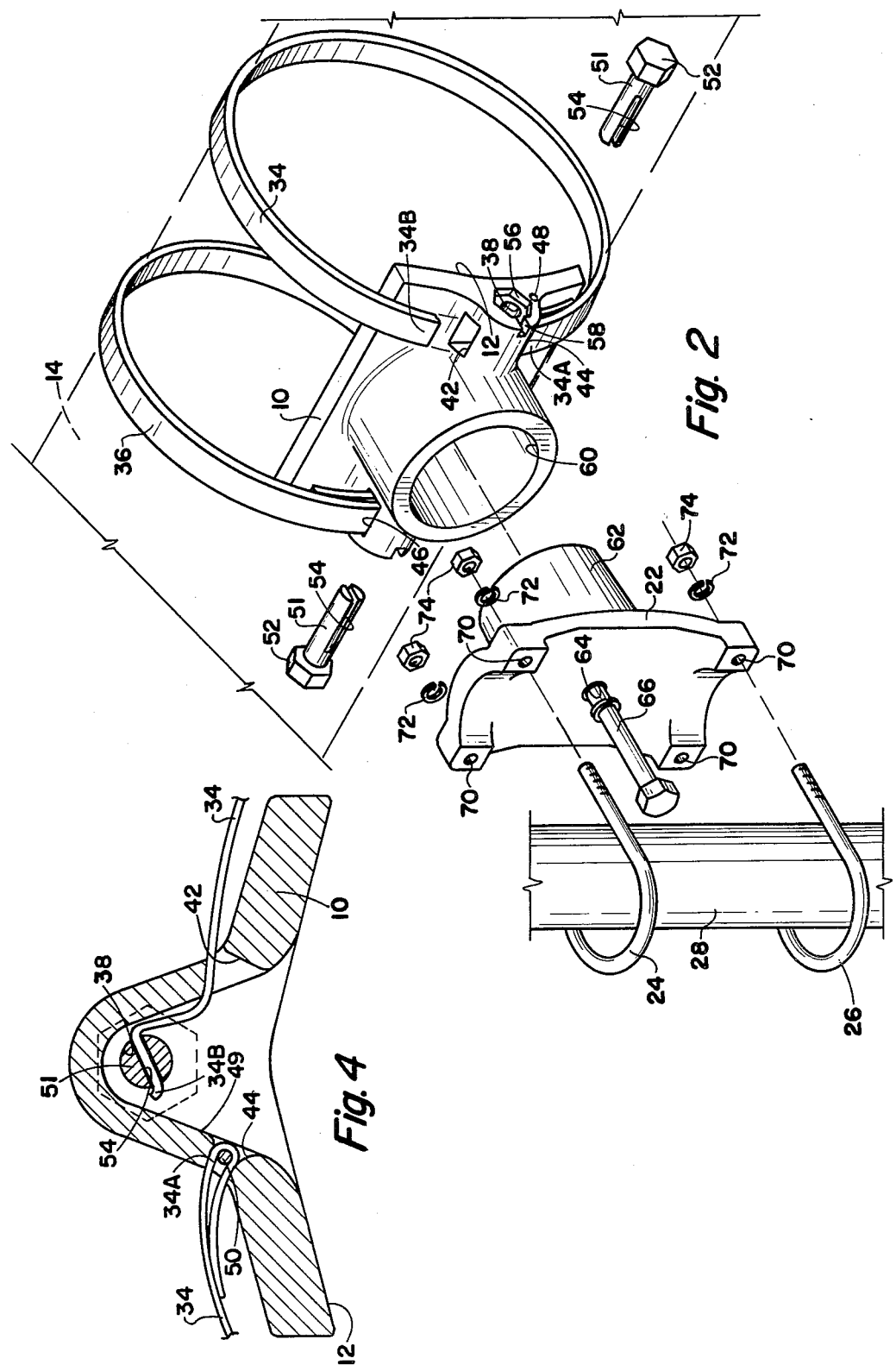
FIG. 2 is an exploded partial view of the bracket of FIG. 1 showing the important portions of the invention as employed for mounting a sign to a mast arm.
Figure 3:
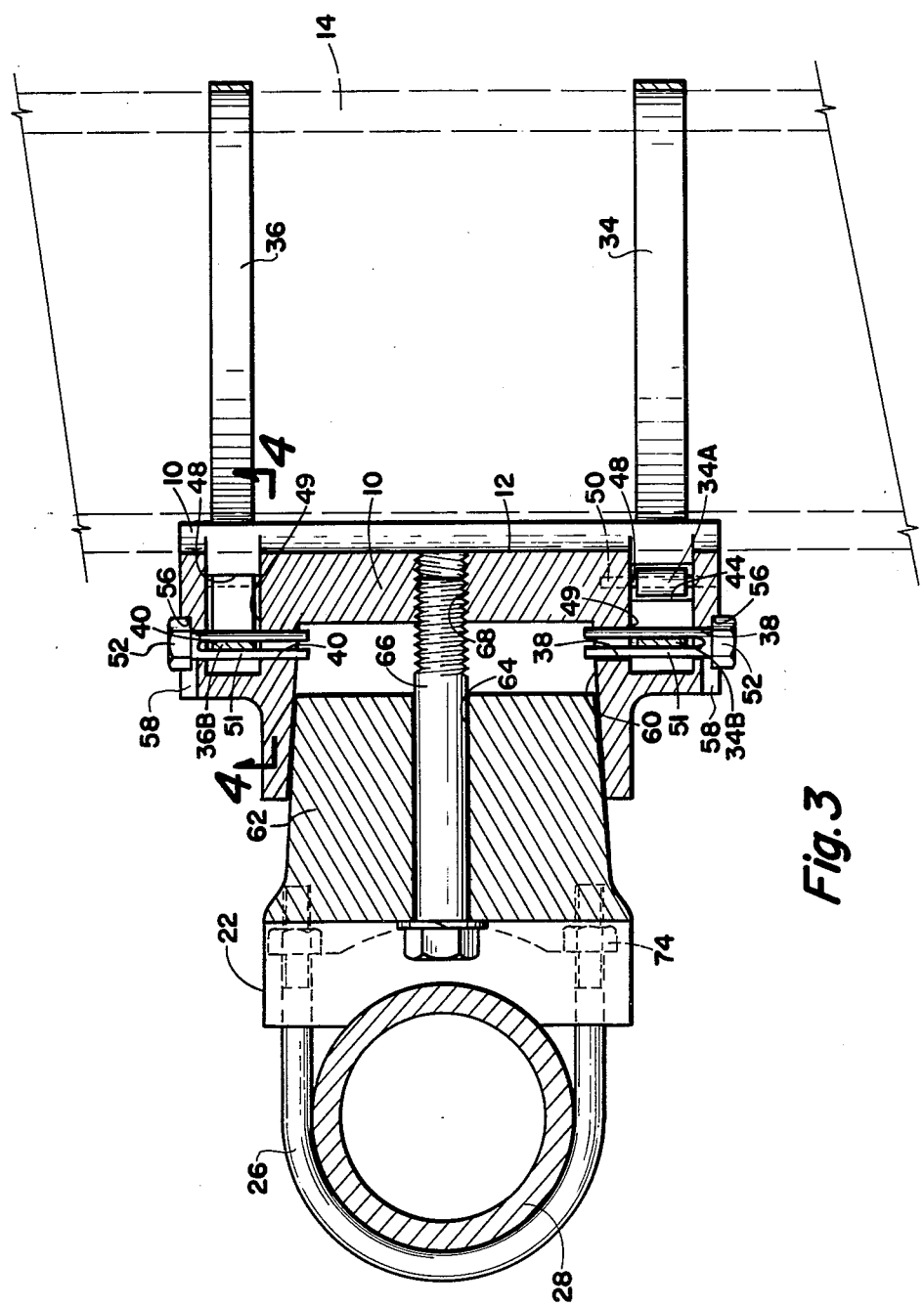
FIG. 3 is a cross-sectional view taken along the line 3—3 of FIG. 1 showing details of the configuration of the 10 bracket body.

FIGS. 2 and 3 show the elements of the invention in greater detail. The bracket body 10 includes first and second small diameter openings 38 and 40 which are parallel the body rearward end 12. The openings 38 and 40 are in axial alignment. Formed in the sides of the body 10 in alignment with opening 38 are slots 42 and 44. In like manner, slots 46 and 48 intersect opening 40. As shown in FIG. 3, body 10 at each side thereof has a recessed area 49 therein communicating with the rearward surface 12. The small diameter openings 38 and 40 extend through this recessed area 49. Slots 42, 44, 46, and 48 communicate with the recess area 49.

Band 34 has one end 34A affixed to the body 10. This may be accomplished in a variety of ways. In the manner illustrated, band end 34A is folded back on itself and positioned within slot 44 (see FIG. 4). A pin 50 is driven through an opening formed in the body to receive the folded end 34A in the slot 44. The other end 34B of the band extends through slot 42 and into recess 49.

Positioned in each of the small diameter recesses 38 and 40 on opposite sides of the body 10 is a bolt 51. Each of the bolts 51 has a noncircular enlarged diameter head 52 which is preferably, as illustrated, hexagonal and the body of every bolt 51 has a slot 54 therein. The bolts are not threaded.

Bolts 51 are positioned in small diameter opening 38 and 40, and each receives in slot 54 the end of a band 34 or 36. By the rotation of bolt 51 by means of a wrench engaging head 52, the bands are wound on the bolts so that they are tightened about the mast arm 14 to snugly hold the bracket body 10 in position against the mast arm.

Formed in the end surfaces of body 10 in alignment with the small diameter openings 38 and 40 are shallow depth larger dimensioned recesses 56 which are noncircular to conform to the shape of the head 52 of the bolts 51. The recesses 56 are preferably, as illustrated, hexagonal. When the bolts 51 are positioned in opening 38 or 40 and the end of bands 34 and 46 are positioned in slots 54; and after the bolts have been rotated to tighten the bands, such as by means of a box end wrench which engages the bolt head 52, the bolts may be driven inwardly so that the heads 52 are received in the shallow depth recesses 56. This locks the bolts in position and prevents them from rotating in the opposite direction so that the bands 34 and 36 are retained securely about the mast arm 14. In this way, a unique arrangement is provided for retaining the tension on the bands without depending upon lock washers or any other mechanism.

Formed in the body 10 in communication with each of the shallow depth recesses 56 is a slot 58 is of depth greater than that of the recesses. The manner of tightening band 34 has been described. It is apparent that some means must be provided to enable the bands 34 and 36 to be loosened to remove the sign from mast arm 14 or to permit adjustment of orientation of the sign. For this purpose, a screwdriver or other wedge-shaped instrument may be inserted in each of the slots 58 to fit under bolt heads 52. The bolts 51 may then be pryed out, that is, axially outwardly displaced so that heads 52 are removed from within the shallow depth recesses 56, allowing the bolts to be rotated to unwind bands 34 and 46.

The body 10 forward end has a large diameter recess 60 which is tapered towards a reduced internal diameter in the direction of rearward end 12. The male bracket portion 22 has a forwardly extending tapered male portion 62 which is received within recess 60. A bolt hole 64 is in axial alignment with the male tapered portion 62 and receives a bolt 66, the threaded end of which is received in threaded opening 68 in bracket body 10. Due to the tapered fit between the male portion 62 and the recess 60, the male bracket portion 22 can be accurately rotatably positioned relative to the bracket body 10 to thereby retain the support tube 28 in the desired orientation. Normally the support tube 28 is vertical; and by adjusting the male bracket portion 62 relative to the bracket body 10 before bolt 66 is tightened, this vertical alignment can be easily achieved.

The male bracket portion 22 has holes 70 to receive the U bolts 26. By means of lock washer 72 and nuts 74 U bolts retain the support tube 28 securely to the male bracket portion. The arms 30 and 32 previously mentioned are secured to the upper ends of the support tube 28 to securely hold the traffic light body 18 in position.

It can be seen that the apparatus which has been described fulfills all of the objectives initially set forth. The bracket body 10 is easily and quickly secured to a post, or mast arm 14, by the use of slotted bolts 50. The bolts are retained in nonrotatable position so that the mast arm once secured in position cannot become loosened by wind or vibration. The tapered fit of the male bracket portion 22 with the bracket body 10 allows for orientation of the sign supported by the bracket to enable the workmen to easily secure the perfect desired orientation and once the bolt 66 is secured in position the orientation of a sign cannot be inadvertently displaced.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. A bracket for supporting a sign to a cylindrical post comprising:

a body portion having a forward end having means to receive a member for the support of a sign, the rearward end being adapted to engage the surface of a cylindrical post to which a sign is to be supported, a small diameter opening in the body portion, the axis of which is parallel to the rearward end and a shallow depth noncircular recess of larger diameter than the small diameter opening in the surface of the body portion coaxial with said small diameter opening and a slot in the body portion communicating with said small diameter opening;

a flexible band having the first end affixed to said body portion, the band extending around a post to which said body portion is affixed for holding a sign, the second end extending into said body portion slot; and a bolt having an enlarged noncircular head non-rotatably receivable in said noncircular recess, the bolt having a slot therein and being received in said small diameter opening, the second end of said band being received in said bolt slot whereby said bolt may be rotated to wind said band thereon to tighten the band and body member against a post after which said bolt head may be driven into said shallow depth recess to retain the bolt in a nonrotatable position.

2. A bracket according to claim 1 wherein said body portion has a second small diameter opening coaxial noncircular shallow depth recess, the small diameter opening being coaxial each other and on opposite sides of the body portion and a second slot in the body portion spaced from said first slot, the second slot communicating with said second small diameter recess;
    a second flexible band having the first end affixed to said body portion, the band extending around a post to which said body portion is affixed for holding a sign, the flexible bands being thereby spaced apart and parallel to each other, the second end of the second band extending in said second body portion slot;
    and a second bolt having an enlarged noncircular head nonrotatably receivable in said second noncircular recess, the bolt having a slot therein and being received in said second small diameter recess, the second end of said second band being received in said second bolt slot whereby said first and second bolts may be rotated to wind said first and second bands respectively thereon to tighten said bands and body member against a post after which the heads of said first and second bolts may be driven into said shallow depth recesses to retain said bolts in nonrotatable positions.

3. A bracket according to claim 1 wherein said shallow depth recess in said body portion is hexagonal and wherein said bolt head is hexagonal to be nonrotatably received in the hexagonal recess.

4. A bracket according to claim 1 wherein said body portion forward end has a large diameter recess therein, the axis of which is perpendicular the axis of said small diameter opening, the large diameter opening being circular in planes perpendicular the opening axis and tapered towards reduced diameters in the diection towards said body portion rearward surface, such tapered opening providing said means to receive a member for the support of a sign and including:
    a male bracket portion having a forward end and a rearward end, the forward end having an integral extending axial portion which is circular in planes perpendicular the portion axis and is tapered towards reduced diameters from the rearward to forward end, the degree of taper and the diameters of the male bracket portion forward end being dimensioned such that it is rotatably receivable in said tapered recess in said first bracket portion, said male bracket portion having means at the rearward end to receive means to support a sign thereto, and
    means of retaining said male bracket portion in engagement with said body portion.

5. A bracket according to claim 4 wherein said body portion and said male bracket portion have means therebetween to receive a bolt in coaxial register with said body portion large diameter recess and said male bracket integrally extending axial portion and a bolt so received, said bolt providing said means of retaining said male bracket portion in engagement with said body portion.

6. A bracket according to claim 4 wherein said male body portion forward end includes means to receive a support tube, and including a support tube so received, and including an arm member affixed adjacent each end of said support tube, the arm members extending in a common plane of said support tube, and adaptable to receive a sign therebetween.

* * * * *